United States Patent [19]
Sekikawa

[11] Patent Number: 5,600,495
[45] Date of Patent: Feb. 4, 1997

[54] STRUCTURE FOR ATTACHING SCANNING OPTICAL SYSTEM

[75] Inventor: Yoshihito Sekikawa, Saitama, Japan

[73] Assignee: Fuji Xerox Co., Ltd., Tokyo, Japan

[21] Appl. No.: 325,477

[22] Filed: Oct. 19, 1994

[30] Foreign Application Priority Data

Dec. 16, 1993 [JP] Japan ..................... 5-316986

[51] Int. Cl.⁶ .................. G02B 07/02; G02B 26/08
[52] U.S. Cl. .................. 359/819; 359/216; 359/226
[58] Field of Search .................. 359/819, 811, 359/205, 206, 198, 199, 200, 210, 216, 217, 218, 219, 220, 221, 225, 226

[56] References Cited

U.S. PATENT DOCUMENTS

| | | | |
|---|---|---|---|
| 4,349,843 | 9/1982 | Laakmann | 358/206 |
| 4,355,860 | 10/1982 | Lavallee | 359/217 |
| 4,397,521 | 8/1983 | Antos | 359/198 |
| 4,796,963 | 1/1989 | Yoshimura | 359/206 |
| 4,866,459 | 9/1989 | Tokita | 346/108 |
| 5,081,544 | 1/1992 | Kikuchi | 359/212 |
| 5,191,483 | 3/1993 | Takizawa | 359/819 |
| 5,280,379 | 1/1994 | Sugiura | 359/217 |
| 5,299,051 | 3/1994 | Hirano | 359/216 |
| 5,357,272 | 10/1994 | Watanabe | 346/108 |
| 5,377,038 | 12/1994 | Uzuki | 359/205 |

FOREIGN PATENT DOCUMENTS

| | | | |
|---|---|---|---|
| 282993 | 9/1990 | Germany | 359/819 |
| 3-56449 | 8/1991 | Japan . | |
| 5281492 | 10/1993 | Japan | 359/819 |
| 6258562 | 9/1994 | Japan | 359/819 |

OTHER PUBLICATIONS

Cade, J. W., "Mounting Optical Elements", Machine Design, 8 Jul. 1965, p. 133.

*Primary Examiner*—Georgia Y. Epps
*Assistant Examiner*—Ricky Mack
*Attorney, Agent, or Firm*—Finnegan, Henderson, Farabow, Garrett & Dunner, L.L.P.

[57] ABSTRACT

Of lenses constituting an f·θ lens, with respect to the lens L2 having a greatest difference between absolute values of surface power at both surfaces thereof, a convex surface having a greater absolute value of surface power is made to abut through line contact against columnar abutment members projecting from the optical housing 10 perpendicularly to the scanning direction. In addition, flat portions provided at both ends of the lens in the scanning direction thereof are supported by supporting members, and the lens is affixed to the abutment members and by means of leaf springs.

13 Claims, 4 Drawing Sheets

1

STRUCTURE FOR ATTACHING SCANNING OPTICAL SYSTEM

BACKGROUND OF THE INVENTION

1. Field of the Invention

The present invention relates to a structure for attaching a scanning optical system, and more particularly to a structure for attaching a scanning optical system in which a scanning optical system in an optical scanning device used in a laser printer or the like is attached to an optical housing.

2. Description of the Related Art

As an attaching structure in which a scanning optical system in a conventional scanning optical system, which is employed widely in copying machines, laser printers, and the like, is attached to an optical housing, Japanese Patent Examined Publication No. Hei 3-56449 proposes attaching structures including the following: an attaching structure wherein flat portions are respectively formed in side portions of both surfaces of each of a biconcave lens, a meniscus lens, and a biconvex lens, and the flat portions are clamped by a holding member and a pressing member so as to attach the lenses to the optical housing, as well as an attaching structure wherein flat portions are respectively formed in side portions of one surface of each of a biconcave lens, a meniscus lens, and a biconvex lens, and each flat portion is held by a holding member while the other surface is pressed at one or a plurality of points by a pressing member or pressing members so as to attach the lenses to the optical housing. If a flat portion is formed on at least one surface of each lens, the flat portion can be brought into surface contact with the holding member, so that each lens can be positioned and held accurately. However, there are cases where it is difficult to form flat portions in such biconcave, meniscus lens, and biconvex lenses. Meanwhile, as shown in FIG. 6(a), with respect to a planoconcave lens or a planoconvex lens, there is no need to newly form a flat portion for being held by a holding member, and since a flat surface is already provided, if the flat surface is held by holding members 52 and 54, the lens can be positioned and held simply and accurately.

However, in the attaching structure for attaching to the optical housing the scanning lens constituted by the aforementioned planoconcave lens or planoconvex lens, since a flat surface S3 of a planoconvex lens, such as the one shown in FIG. 6(a), is held by the holding members 52 and 54, in the event that a convex surface S4 of the lens has changed from the convex surface S4 to a convex surface S4' due to a variation in the thickness of the lens owing to a production error, the direction of emergence of the laser beam from the lens changes from a direction B1 to a direction B2. Hence, the performance of the scanning optical system, particularly the linearity of the laser beam emergent from the scanning optical system, deteriorates, i.e., there occurs a large divergence with respect to the height of an ideal image. Consequently, there is a problem in that it is impossible to effect accurate scanning.

The above and other objects and features of the present invention will be more apparent from the following description taken in conjunction with the accompanying drawings.

SUMMARY OF THE INVENTION

The present invention has been devised to overcome the above-described problems, and an object of the invention is to provide a structure for attaching a scanning optical system which makes it possible to reduce a divergence of a laser beam in the direction of emergence from the scanning optical system even in a case where there is a variation in the thickness of the lens.

To attain the above object, according to a first aspect of the invention, an optical housing is provided with an abutment member, and a scanning optical system constituted by a single lens is attached to the optical housing by causing a surface, having a greater absolute value of the reciprocal of a radius of curvature, of the scanning optical system to abut against the abutment member.

According to a second aspect of the invention, an optical housing is provided with an abutment member, and a scanning optical system constituted by a plurality of lenses is attached to the optical housing by causing a surface, having a greater absolute value of the reciprocal of a radius of curvature, of at least one of the lenses which has a greatest difference between absolute values of reciprocals of radii of curvature at both surfaces thereof to abut against the abutment member.

According to a third aspect of the invention, an optical housing is provided with a plurality of abutment members, and a scanning optical system constituted by a plurality of lenses is attached to the optical housing by causing a surface, having a greater absolute value of the reciprocal of a radius of curvature, of each of the lenses to abut against the abutment members.

In the first aspect of the invention, the optical housing is provided with an abutment member, and the scanning optical system constituted by a single lens is attached to the optical housing by causing the surface, having a greater absolute value of the reciprocal of the radius of curvature, of the scanning optical system to abut against the abutment member.

Here, if consideration is given to the refraction of a curved surface, if it is assumed that the radius of curvature of the curved surface is R, a refractive index of a medium of the curved surface on the incident side thereof is n, a medium on the emergent side is air, and a focal length is f, the following relation (1) holds among them:

$$f=R/(1-n) \qquad (1)$$

From this Formula (1), an absolute value of the reciprocal of the radius of curvature (hereafter referred to as surface power) is proportional to the reciprocal of the focal length. Therefore, the greater the absolute value of the surface power, the greater the power for refracting the light beam. Accordingly, as shown in FIG. 6(a) already described, if the flat surface S3 is made to abut against the abutment members 52, 54, and if there is a variation in the thickness of the lens L2 due to a production error or the like, the convex surface S4, which is the surface having greater power for refracting the light beam and has a greater absolute value of the surface power, changes. Consequently, the power for refracting the light beam exerts a large effect on the direction of emergence of the laser beam from the lens L2. Meanwhile, if the convex surface S4 having a greater absolute value of the surface power is made to abut against abutment members 22 and 24, as shown in FIG. 6(b), and if there is a variation in the thickness of the lens L2, the position of the flat surface S3 having smaller surface power changes. However, since the surface having smaller power for refracting the light beam changes, the effect of the power for refracting the light beam is small. In addition, even if there is a variation in the thickness of the lens L2, the positional change of the curved surface S4 having greater surface power is nil, or, if any, very small. Consequently, the effect of power for refracting the light beam is practically not exerted on the emergent direction of the laser beam.

Accordingly, in the present invention, as the surface having greater surface power is made to abut against the abutment member, the change in the direction of emergence of the laser beam from the lens is suppressed to a very small level. Consequently, even if the lens thickness varies, it is possible to reduce the change in the linearity of the emergent laser beam.

A lens having a greater difference between absolute values of the reciprocals of the radii of curvature at both surfaces of thereof undergoes a greater change in the linearity of the emergent laser beam due to such a variation in the thickness of the lens. Accordingly, in the second aspect of the invention, the optical housing is provided with an abutment member, and the scanning optical system constituted by a plurality of lenses is attached to the optical housing by causing the surface, having a greater absolute value of the reciprocal of the radius of curvature, of at least one of the lenses which has a greatest difference between absolute values of reciprocals of radii of curvature at both surfaces thereof to abut against the abutment member. Consequently, it is possible to suppress to a small level the change in linearity of at least the lens which undergoes a greatest change in linearity, so that the change in linearity of the overall scanning optical system can be reduced.

Furthermore, in the third aspect of the invention, the optical housing is provided with a plurality of abutment members, and the scanning optical system constituted by a plurality of lenses is attached to the optical housing by causing the surface, having a greater absolute value of the reciprocal of the radius of curvature, of each of the lenses to abut against the abutment members. Consequently, it is possible to minimize the change in linearity of the overall scanning optical system.

DETAILED DESCRIPTION OF THE PREFERRED EMBODIMENTS

Figure 1:
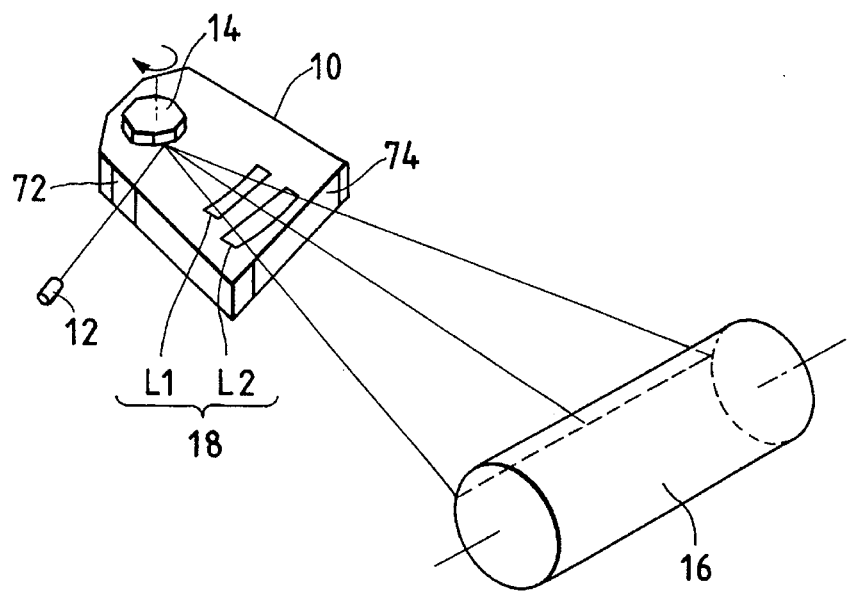
FIG. 1 is a oblique illustration of an optical scanning device in accordance with one embodiment of the present invention.

Referring now to the drawings, description will be given in detail of an embodiment of the present invention. FIG. 1 shows a schematic structure of an optical scanning device in a laser printer in which a scanning optical system is attached to an optical housing by applying the structure for attaching a scanning optical system in accordance with this embodiment. As shown in FIG. 1, the optical scanning device is comprised of a semiconductor laser 12 and an optical housing 10.

Figure 2:
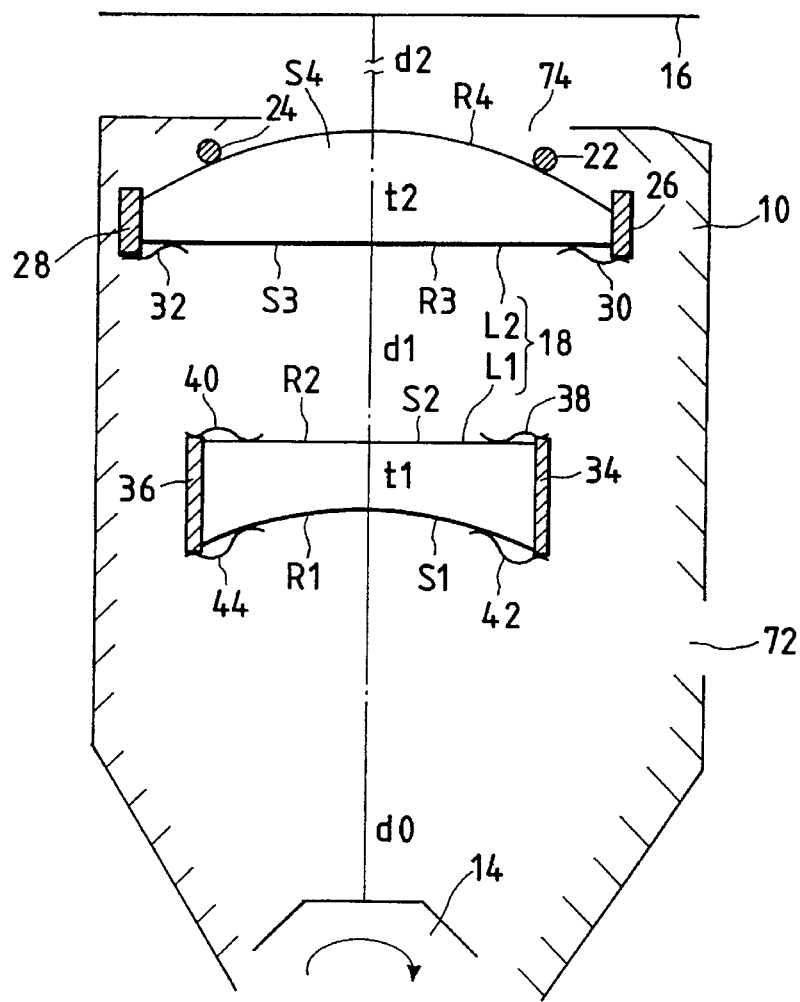
FIG. 2 is a detailed schematic diagram of the optical housing illustrated in FIG. 1.

As shown in detail in FIG. 2, a rotating polygon mirror 14 and an f·θ lens 18, i.e., a scanning optical system constituted by lenses L1 and L2, are accommodated in the optical housing 10. As shown in FIG. 2, in this embodiment, of the lenses L1 and L2 constituting the f·θ lens 18, with respect to the lens L2 which is a lens having a greatest difference between absolute values of surface power at both surfaces thereof, a convex surface S4 having a greater absolute value of surface power, of both surfaces of that lens L2, is made to abut through line contact against columnar abutment members 22 and 24 projecting from the optical housing 10 perpendicularly to the scanning direction. In addition, flat portions provided at both ends of the lens L2 in the scanning direction thereof are supported by supporting members 26 and 28, and the lens L2 is affixed to the abutment members 22 and 24 by means of leaf springs 30 and 32. In other words, since the lens L2 is a planoconvex lens and the radius of curvature R3 of a surface S3 is infinite, the surface power of the surface S3 is 0. In addition, in this embodiment, if it is assumed that the distance measured in the direction of travel of a light beam is positive, and that the distance measured in an opposite direction to the direction of travel of the light beam is negative, the radius of curvature R4 of the convex surface S4 is −110.4 [mm]. Accordingly, the absolute value of the surface power of the convex surface S4 is greater than the absolute value of the surface power of the flat surface S3. Hence, the lens L2 is affixed to the optical housing 10 by causing the convex surface S4 to abut against the abutment members 22 and 24. Incidentally, the lens L1 is arranged such that flat portions at both ends of the lens L1 in the scanning direction thereof are supported by supporting members 34 and 36, and a flat surface S2 of the lens L1 is affixed by leaf springs 38 and 40, while a concave surface S1 thereof is affixed by leaf springs 42 and 44.

Since the lens L2 is attached to the optical housing by causing the surface S4 having a greater absolute value of surface power to abut against the abutment members 22 and 24, even if there is a variation in the thickness t2 of the lens L2 as described above, the flat surface S3 having a smaller absolute value of surface power changes, and the positional change in the curved surface S4 having a greater absolute value of surface power is nil, or, if any, very small. Consequently, the effect of power for refracting the light beam is practically not exerted on the emergent direction of the laser beam.

Next, description will be given of the operation of the optical scanning device in a laser printer in which the scanning optical system is attached to the optical housing by applying the structure for attaching a scanning optical system in accordance with this embodiment. A laser beam emergent from the semiconductor laser 12 is made incident through an incident hole 72 upon the rotating polygon mirror 14 accommodated in the optical housing 10. Since the rotating polygon mirror 14 rotates at a high equal velocity by an unillustrated rotating polygon mirror-driving motor, the laser beam incident upon the rotating polygon mirror 14 is deflected by the rotation at a high equal velocity of the rotating polygon mirror 14. The deflected laser beam is focused on a photosensitive material of a photoconductive drum 16 as a light spot through an emergent hole 74 by means of the f·θ lens 18. This light spot is moved at an equal velocity on the surface of the photosensitive material by means of the rotation at an equal velocity of the rotating polygon mirror 14 and the f·θ lens 18. Consequently, the surface of the photoconductive drum is scanned in line units. As a result, an electrostatic latent image corresponding to image data is formed on the surface of the photoconductive drum 16. It should be noted that the correction of inclination of the reflecting surface (surface inclination correction) of the rotating polygon mirror 14 is effected by the f·θ lens 18.

Figure 3A:
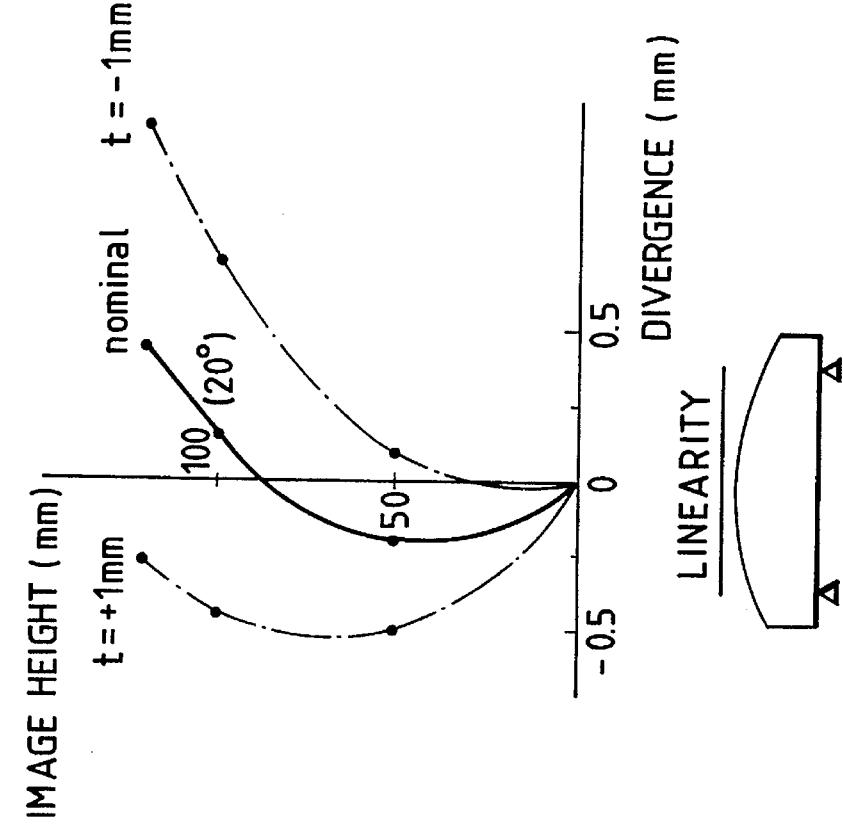
FIG. 3(a) is a diagram illustrating the relationship between the height of an ideal image and a divergence with respect to the height of the ideal image in a case where a surface having a greater absolute value of surface power is positioned.
Figure 3B:
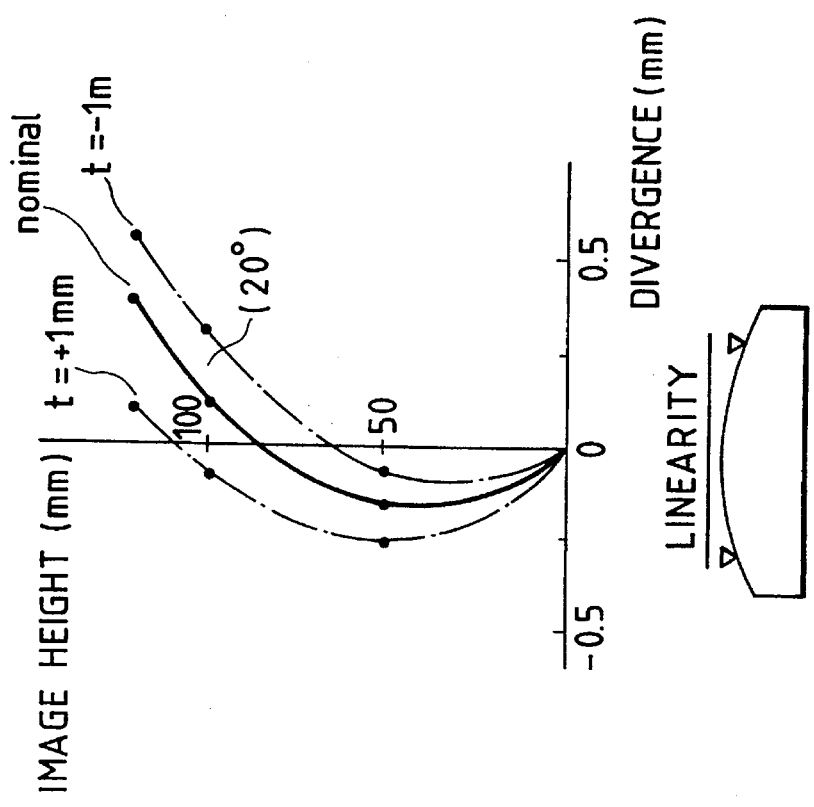
FIG. 3(b) is a diagram illustrating the relationship between the height of an ideal image and a divergence with respect to the height of the ideal image in a case where a surface having a smaller absolute value of surface power is positioned.

Next, description will be given of the lineality of the laser beam made emergent from the f·θ lens 18 in this embodiment. The description will be given by comparing the change in lineality in accordance with this embodiment shown in FIG. 3(a) with the change in linearity shown in FIG. 3(b) in which the scanning optical system was attached to the optical housing by causing the surface having a smaller absolute value of surface power to abut against abutment members. Here, FIGS. 3(a) and 3(b) graphically illustrate the change in linearity (the relationship between the height of an ideal image and a divergence with respect to the ideal image height) in a case where the thickness t2 of the lens L2 varied by ±1 [mm]. Here, the graphs of FIGS. 3(a) and 3(b) show a case in which the refractive indices of the lenses L1 and L2 shown in FIG. 2 were 1.609116 and 1.712282, respectively, and the distance d0 from the rotating polygon mirror 14 to the lens L1, the distance d1 from the lens L1 to the lens L2, and the distance d2 from the lens L2 to the photoconductive drum 16 were 31 [mm], 21 [mm], and 319 [mm], respectively. In addition, the radii of curvature R1 and R2 of the lens L1 were −162.6 [mm] and [mm], respectively, and the radii of curvature of the lens L2 were [mm] and −110.4 [mm], respectively. Furthermore, the thicknesses t1 and t2 of the lenses L1 and L2 were 8 [mm] and 11 [mm], respectively. Incidentally, the wavelength of the incident laser beam was 780 [nm].

As shown in FIGS. 3(a) and 3(b), if the lens thickness varied from a reference thickness by +1 [mm], the divergence with respect to an ideal image height of 100 [mm] was −0.1 [mm] in FIG. 3(a), whereas it was −0.48 [mm] in FIG. 3(b). Further, the divergence with respect to an ideal image height of 50 [mm] was −0.25 [mm] in FIG. 3(a), whereas it was −0.5 [mm] in FIG. 3(b). Meanwhile, if the lens thickness varied from a reference thickness by −1 [mm], the divergence with respect to an ideal image height of 100 [mm] was 0.3 [mm] in FIG. 3(a), whereas it was 0.62 [mm] in FIG. 3(b). Further, the divergence with respect to an ideal image height of 50 [mm] was −0.08 [mm] in FIG. 3(a), whereas it was 0.1 [mm] in FIG. 3(b). Accordingly, it can be appreciated that the change in linearity in accordance with this embodiment (FIG. 3(a)) is smaller than the change in linearity (FIG. 3(b)) in the case where the scanning optical system is attached to the optical housing by causing the surface having a smaller absolute value of surface power to abut against abutment members.

As described above, in this embodiment, the scanning optical system is attached to the optical housing by causing the surface, having a greater absolute value of the reciprocal of the radius of curvature, of the lens having a greatest difference between absolute values of the reciprocals of the radii of curvature at both surfaces, to abut against the abutment members. Consequently, it is possible to suppress to a small level the change in linearity of at least the lens which undergoes a greatest change in linearity, so that the change in linearity of the overall scanning optical system can be reduced. Accordingly, it is possible to effect accurate scanning.

Figure 4A:
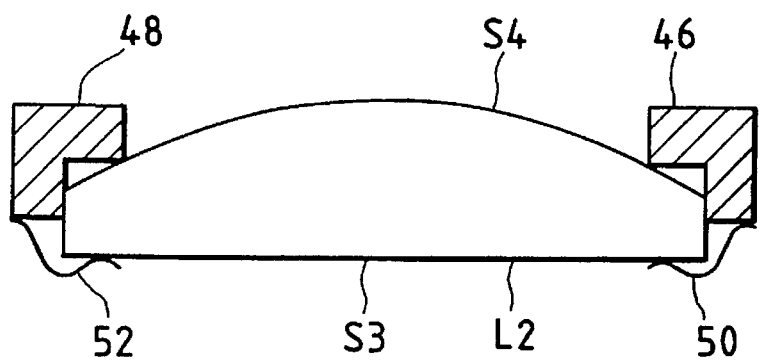
FIGS. 4(a) and 4(b) are schematic diagrams illustrating two other embodiments for attaching a scanning lense to an optical housing in accordance with the present invention.
Figure 4B:
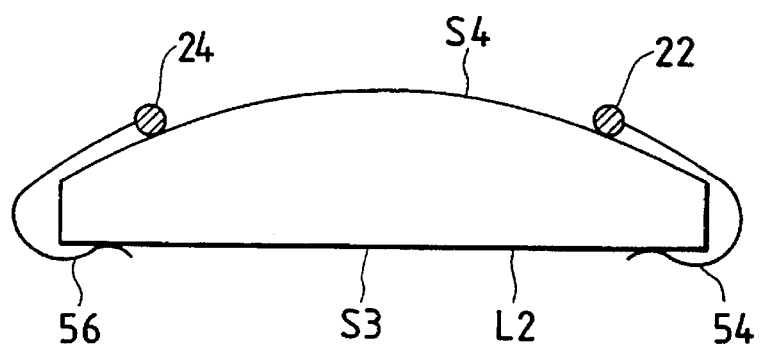

Although, in the above-described embodiment, the scanning lens is made to abut against abutment members of the optical housing, and is affixed by means of supporting members and leaf springs, the present invention is not limited to the same. Namely, since it suffices if the surface having a greater absolute value of the reciprocal of the radius of curvature is made to abut against the abutment members provided in the optical housing, it is possible to adopt the arrangement shown in FIGS. 4(a) and 4(b), for instance. In other words, in FIG. 4(a), the convex surface S4 having a greater absolute value of the reciprocal of the radius of curvature is made to abut against abutment members 46 and 48 functioning as both the abutment members and the supporting members of the above-described embodiment, while the flat surface S3 is held by leaf springs 50 and 52 joined to the abutment members 46 and 48, respectively, thereby affixing the lens to the optical housing. Furthermore, in FIG. 4(b), the convex surface S4 having a greater absolute value of the reciprocal of the radius of curvature is made to abut against the columnar abutment members 22 and 24 projecting from the optical housing, while the flat surface S3 is held by leaf springs 54 and 56 joined to the abutment members 22 and 24, respectively, thereby fixing the lens to the optical housing.

Figure 5:
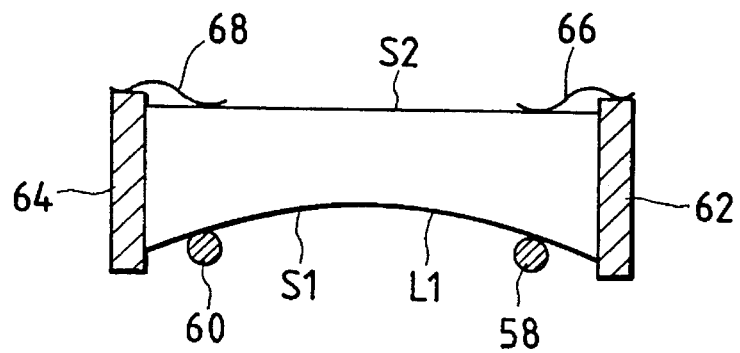
FIG. 5 is a schematic diagram in which another scanning lens is made to abut against abutment members of the optical housing in accordance with the present invention.
Figure 6A:
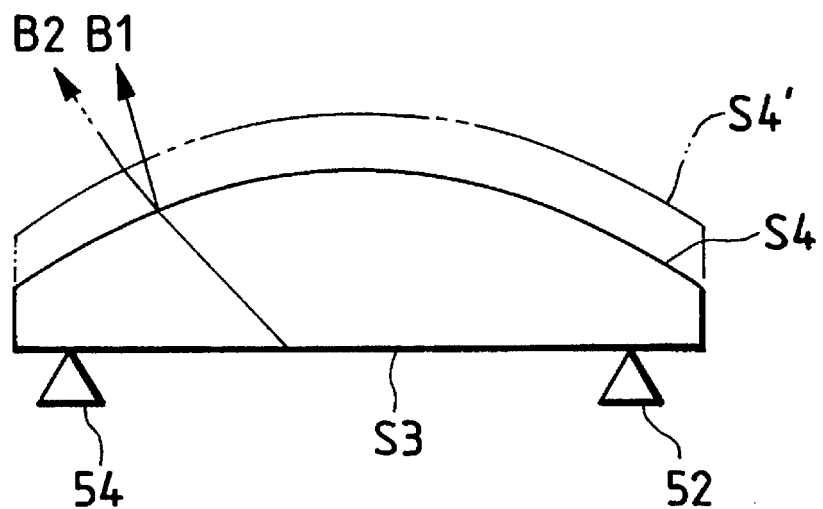
FIG. 6(a) is a diagram illustrating a path along which a laser beam travels in a case where a surface having a smaller absolute value of surface power is positioned, and the thickness of a lens varies.
Figure 6B:
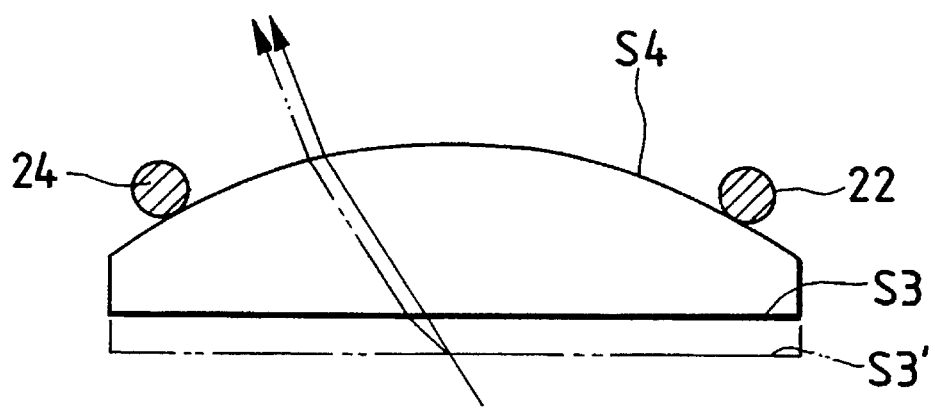
FIG. 6(b) is a diagram illustrating a path along which a laser beam travels in a case where a surface having a greater absolute value of surface power is positioned, and the thickness of a lens varies.

In addition, although, in the above-described embodiment, with respect to only the lens having a greatest difference between the absolute values of surface power at both surfaces of the lens, the surface having a greater absolute value of surface power, of the surfaces of the lens, is made to abut against the abutment members so as to affix the lens to the optical housing, the present invention is not limited to the same. Namely, with respect to all the lenses, the surfaces each having a greater absolute value of surface power of the surfaces of the lenses may be made to abut against abutment members, so as to affix the lenses to the optical housing. In other words, also with respect to the lens L1 shown in FIG. 2, as shown in FIG. 5, the concave surface S1 having a greater absolute value of surface power is made to abut against abutment members 58 and 60. At the same time, flat portions at both ends of the lens L1 in the scanning direction are supported by supporting members 62 and 64, and the lens L1 is secured to the abutment members by leaf springs 66 and 68. Consequently, the change in linearity of the laser beam is minimized, and the tolerance of the optical housing itself is alleviated, thereby making it possible to reduce the cost. Additionally, the distance between the lenses can be reduced.

Although, in the above-described embodiment, a description has been given of a scanning optical system using a rotating polygon mirror, the present invention is not limited to the same. For instance, the present invention is also applicable to a scanning optical system using a resonant scanner or a galvanometer mirror. In addition, although, in the above-described embodiment, a description has been given of a case where the number of lenses constituting the f·θ lens is two, the present invention is not limited to the same, and is also applicable to a single scanning lens formed of a plastic or the like. Furthermore, the present invention is also applicable to a case where the scanning optical system is constituted by a plurality of lenses.

As described above, in the first aspect of the invention, an optical housing is provided with an abutment member, and the scanning optical system constituted by a single lens is attached to the optical housing by causing a surface, having a greater absolute value of the reciprocal of a radius of curvature, of the scanning optical system to abut against the abutment member. Accordingly, even in cases where there is a variation in the thickness of the lens, there is an advantage in that it is possible to reduce the change in the linearity of the scanning optical system.

In the second aspect of the invention, an optical housing is provided with an abutment member, and the scanning optical system constituted by a plurality of lenses is attached to the optical housing by causing a surface, having a greater absolute value of the reciprocal of a radius of curvature, of at least one of the lenses which has a greatest difference between absolute values of reciprocals of radii of curvature at both surfaces thereof to abut against the abutment member. Accordingly, there is an advantage in that it is possible to control to a small level the change in linearity of at least the lens which undergoes a greatest change in linearity, so that the change in linearity of the overall scanning optical system can be reduced.

In the second aspect of the invention, an optical housing is provided with a plurality of abutment members, and that the scanning optical system constituted by a plurality of lenses is attached to the optical housing by causing a surface, having a greater absolute value of the reciprocal of a radius of curvature, of each of the lenses to abut against the abutment members. Accordingly, there is an advantage in that it is possible to minimize the change in linearity of the overall scanning optical system.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A structure for precisely orienting a scanning optical system having a lens, the structure comprising:

an optical housing;

at least two abutment members disposed on said optical housing, the abutment members being configured to precisely engage on a curved lens surface on a side of the lens having a greatest absolute value of a reciprocal of a radius of curvature;

means on the optical housing for orienting the lens in a path of light reflected by a rotatable mirror; and spring means associated with the lens for biasing the curved lens surface against abutment members.

2. A structure according to claim 1, wherein the housing and abutment members are configured to permit a bundle of rays passing through said optical housing to travel from a side of said lens toward a side of an abutment member.

3. A structure according to claim 1 wherein the abutment members are oriented within the housing so that the abutment members exclusively define a precise location of the curved lens surface.

4. A structure according to claim 1 wherein the spring means includes a leaf spring.

5. A structure for precisely orienting a scanning optical system having a plurality of lenses, the structure comprising:

an optical housing;

at least two abutment members disposed on said optical housing, the abutment members being configured to precisely engage a curved surface on one side of one of said plurality of lenses, wherein a difference between absolute values of reciprocals of radii of curvature of opposing lens sides of said one lens is greater than differences between absolute values of reciprocals of radii of curvature of opposing sides of any other lens in the scanning optical system, and wherein the abutment members are oriented so that a surface on a side of said one lens with a greatest absolute value of a reciprocal of a radius of curvature contacts the abutment members;

means on the optical housing for orienting said one lens in a path of light reflected by a rotatable mirror; and spring means associated with said one lens for biasing the curved lens surface against the abutment members.

6. A structure according to claim 5, wherein the housing and abutment members are configured to permit a bundle of rays passing through said optical housing to travel from a side of said plurality of lenses toward a side of an abutment member.

7. A structure according to claim 5 wherein the abutment members exclusively define a precise location of a curved surface of said one lens.

8. A structure according to claim 5 wherein the spring means includes a leaf spring.

9. A structure for precisely orienting a scanning optical system having a plurality of lenses, the structure comprising:

an optical housing;

a plurality of abutment members disposed on said optical housing, the abutment members being configured to precisely engage a curved lens surface of said plurality of lenses, which surface is located on a lens side having a greatest absolute value of a reciprocal of a radius of curvature, and wherein said side having said curved lens surface abuts against at least two of said abutment members;

means on the optical housing for orienting at least one lens in a path of light reflected by a rotatable mirror; and spring means associated with said at least one lens for biasing the curved lens surface against the abutment members.

10. A structure according to claim 9, wherein the housing and abutment members are configured to permit a bundle of rays passing through said optical housing to travel from a side of said lenses toward a side of an abutment member.

11. A structure according to claim 9 wherein the abutment members exclusively define the precise location of a curved surface of at least one of said plurality of lenses.

12. A structure according to claim 9 wherein the abutment members engage a curved lens surface of each of said plurality of lenses which curved lens surface has a greatest absolute value of a reciprocal of a radius of curvature.

13. A structure according to claim 9 wherein the spring means includes a leaf spring.

* * * * *

UNITED STATES PATENT AND TRADEMARK OFFICE
CERTIFICATE OF CORRECTION

PATENT NO. : 5,600,495
DATED : February 04, 1997
INVENTOR(S) : Yoshihito SEKIKAWA It is certified that error appears in the above-indentified patent and that said Letters Patent is hereby corrected as shown below:

Claim 1, column 7, line 61, before "abutment" insert --the--.

Signed and Sealed this

Seventh Day of October, 1997

Attest:

Attesting Officer

BRUCE LEHMAN

Commissioner of Patents and Trademarks